Nov. 15, 1955 A. D. SIMPSON 2,723,599

MEANS FOR PREVENTING LEAKAGE OF FLUID PRESSURE FROM TANKS THROUGH OPENINGS HAVING MOVABLE PARTS MOUNTED THEREIN

Filed March 28, 1951 13 Sheets-Sheet 1

Inventor:
Alvan D. Simpson
BY Harry B. Cook,
Attorney.

Nov. 15, 1955

A. D. SIMPSON

MEANS FOR PREVENTING LEAKAGE OF FLUID PRESSURE FROM TANKS THROUGH OPENINGS HAVING MOVABLE PARTS MOUNTED THEREIN 2,723,599

Filed March 28, 1951

13 Sheets-Sheet 2

Inventor:
Alvan D. Simpson

BY Harry B. Cook,
Attorney.

Nov. 15, 1955 A. D. SIMPSON 2,723,599

MEANS FOR PREVENTING LEAKAGE OF FLUID PRESSURE FROM TANKS THROUGH OPENINGS HAVING MOVABLE PARTS MOUNTED THEREIN

Filed March 28, 1951 13 Sheets-Sheet 3

Inventor
Alvan D. Simpson
BY Harry ... Cook,
Attorney.

Nov. 15, 1955 A. D. SIMPSON 2,723,599

MEANS FOR PREVENTING LEAKAGE OF FLUID PRESSURE FROM TANKS THROUGH OPENINGS HAVING MOVABLE PARTS MOUNTED THEREIN

Filed March 28, 1951

13 Sheets-Sheet 4

Inventor:
Alvan D. Simpson
BY
[signature]
Attorney.

Inventor
Alvan D. Simpson
BY [signature]
Attorney.

Nov. 15, 1955 A. D. SIMPSON 2,723,599

MEANS FOR PREVENTING LEAKAGE OF FLUID PRESSURE FROM TANKS THROUGH OPENINGS HAVING MOVABLE PARTS MOUNTED THEREIN

Filed March 28, 1951

13 Sheets-Sheet 6

Inventor:
Alvan D. Simpson
BY Harry B. Cook
Attorney.

Nov. 15, 1955 A. D. SIMPSON 2,723,599

MEANS FOR PREVENTING LEAKAGE OF FLUID PRESSURE FROM TANKS THROUGH OPENINGS HAVING MOVABLE PARTS MOUNTED THEREIN

Filed March 28, 1951 13 Sheets-Sheet 7

Inventor:
Alvan D. Simpson
BY Harry A. Cook,
Attorney.

Inventor
Alvan D. Simpson
BY
Harry M. Cook,
Attorney.

Nov. 15, 1955 A. D. SIMPSON 2,723,599

MEANS FOR PREVENTING LEAKAGE OF FLUID PRESSURE FROM TANKS THROUGH OPENINGS HAVING MOVABLE PARTS MOUNTED THEREIN

Filed March 28, 1951 13 Sheets-Sheet 9

Inventor
Alvan D. Simpson
BY Harry B. Cook,
Attorney.

Nov. 15, 1955

A. D. SIMPSON 2,723,599

MEANS FOR PREVENTING LEAKAGE OF FLUID PRESSURE FROM TANKS THROUGH OPENINGS HAVING MOVABLE PARTS MOUNTED THEREIN

Filed March 28, 1951

13 Sheets-Sheet 10

Inventor:
Alvan D. Simpson

BY Harry B. Cook,
Attorney.

Nov. 15, 1955 A. D. SIMPSON 2,723,599

MEANS FOR PREVENTING LEAKAGE OF FLUID PRESSURE FROM TANKS THROUGH OPENINGS HAVING MOVABLE PARTS MOUNTED THEREIN

Filed March 28, 1951 13 Sheets-Sheet 11

Inventor:
Alvan D. Simpson
BY Harry A. Cook
Attorney.

Nov. 15, 1955 A. D. SIMPSON 2,723,599

MEANS FOR PREVENTING LEAKAGE OF FLUID PRESSURE FROM TANKS THROUGH OPENINGS HAVING MOVABLE PARTS MOUNTED THEREIN

Filed March 28, 1951

13 Sheets-Sheet 12

Inventor:
Alvar D. Simpson
BY
Harry ... Cook,
Attorney.

Inventor:
Alvan D. Simpson
BY Harry B. Cook,
Attorney.

United States Patent Office 2,723,599

Patented Nov. 15, 1955

2,723,599

MEANS FOR PREVENTING LEAKAGE OF FLUID PRESSURE FROM TANKS THROUGH OPENINGS HAVING MOVABLE PARTS MOUNTED THEREIN

Alvan D. Simpson, Plainfield, N. J., assignor to The Forming Machine Company of America, Inc., Bound Brook, N. J., a corporation of Delaware Application March 28, 1951, Serial No. 217,906

28 Claims. (Cl. 92—38)

This invention relates specifically to a machine for making continuous strips or webs by the deposit of material from a wet mix onto the perforate peripheral wall of a hollow drum that is mounted on a horizontal axis in a tank containing a wet mix of asbestos-cement composition or the like in its lower portion and air under pressure in its upper portion so that as the drum is rotated through a wet mix, the liquid from the mix is forced through the screen and the solid matter in the mix is deposited on the outer surface of said perforate wall, after which the deposited layer is moved out of the mix to permit draining of the liquid from the layer and whence the layer is removed from the drum through an opening in one wall of the tank. A machine of this general nature is described and claimed in my co-pending application Serial No. 24,054 filed April 29, 1948, now Patent No. 2,581,210. In that machine a portion of the drum is exposed through said opening in the tank wall and rollers contacting with the deposited layer and with said drum are journaled in the tank at each of the upper and lower edges of said opening, respectively, as parts of mechanism for preventing the escape of fluid from the tank through said opening.

While the present invention is especially concerned with the improvement of sealing means for preventing leakage of fluid between the walls of said tank and said drum and said rollers, it is contemplated to use the invention in other machines where it may be desired to prevent leakage at the juncture of stationary and movable parts.

In the broader aspects of the invention, a prime object is to provide a novel and improved, simple, inexpensive, reliable and durable means for sealing the space between relatively movable surfaces; and more specifically, an important object of the invention is to provide sealing means between the stationary walls of a tank, the peripheral or circumferential surfaces of a drum rotatably mounted in the tank with a portion exposed through an opening in one wall of the tank, and between the tank walls and the end surfaces and peripheral or circumferential surfaces of a roller journaled in said tank and having a portion exposed through said opening.

Another object is to provide such sealing means that shall also seal the zone of juncture of such a roller with such a drum.

A further object is to provide novel and improved means for sealing the juncture of such a roller with such a drum wherein the drum shall have shoulders perpendicular to the drum axis, the ends of the roller shall frictionally abut said shoulders and said roller shall be longitudinally adjustable to adjust and maintain the contact between the roller ends and said shoulders.

Still another object is to provide a novel and improved construction for such a longitudinally adjustable roller.

Further objects are to provide sealing means of the general character described which shall include a resilient or elastic element and means for holding it with portions thereof in contact with the surfaces of the relatively movable parts, respectively; to provide novel and improved means for maintaining contact of said sealing element with the respective surfaces, and to provide means for flushing away from said surfaces solid matter that might accumulate on, for example the portions of such sealing means disposed below the level of a wet mix.

Other objects, advantages and results of the invention will be brought out by the following description in conjunction with the accompanying drawings in which Figure 1 is an end elevational view of a positive pressure machine for making continuous strips of material from a wet mix, embodying sealing means constructed in accordance with the invention;

Figures 14, 15, 16:
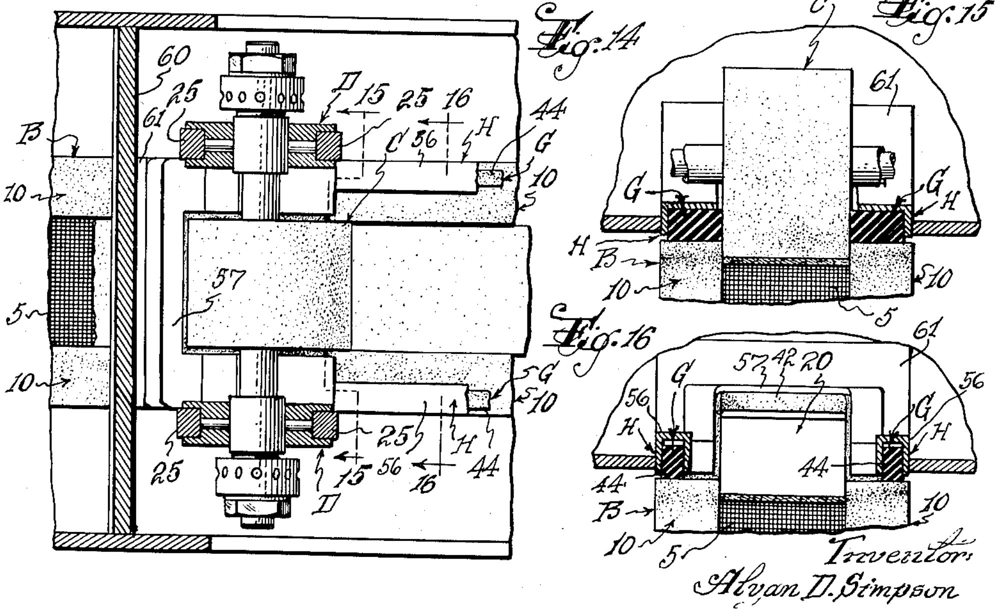
Figures 3, 4:
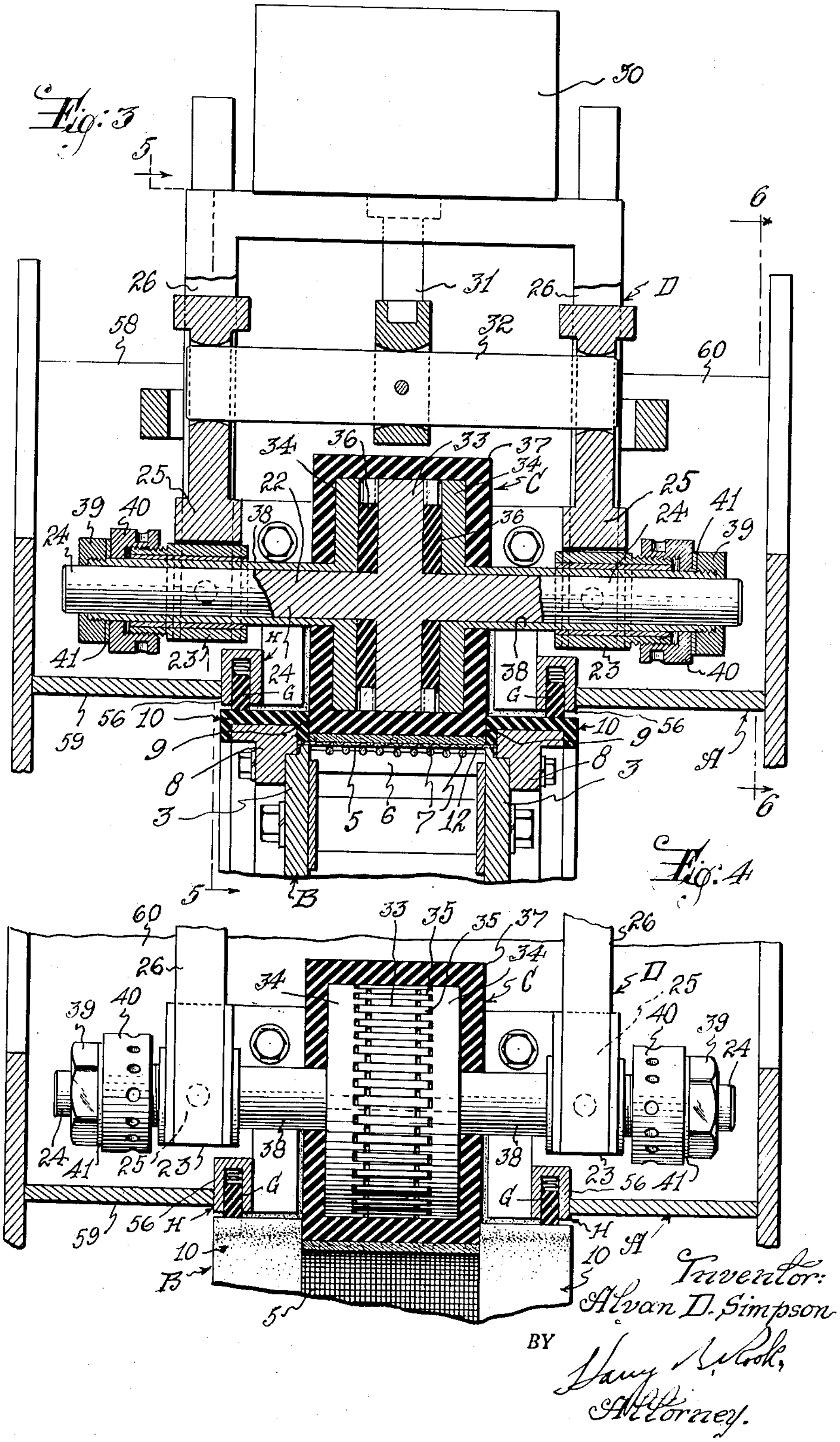
Figure 3 is an enlarged fragmentary longitudinal sectional view approximately on the plane of the line 3—3 of Figure 1.
Figure 4 is a similar view approximately on the plane of the line 4—4 of Figure 1; with portions broken away.
Figures 5, 6, 9, 10, 11, 12:
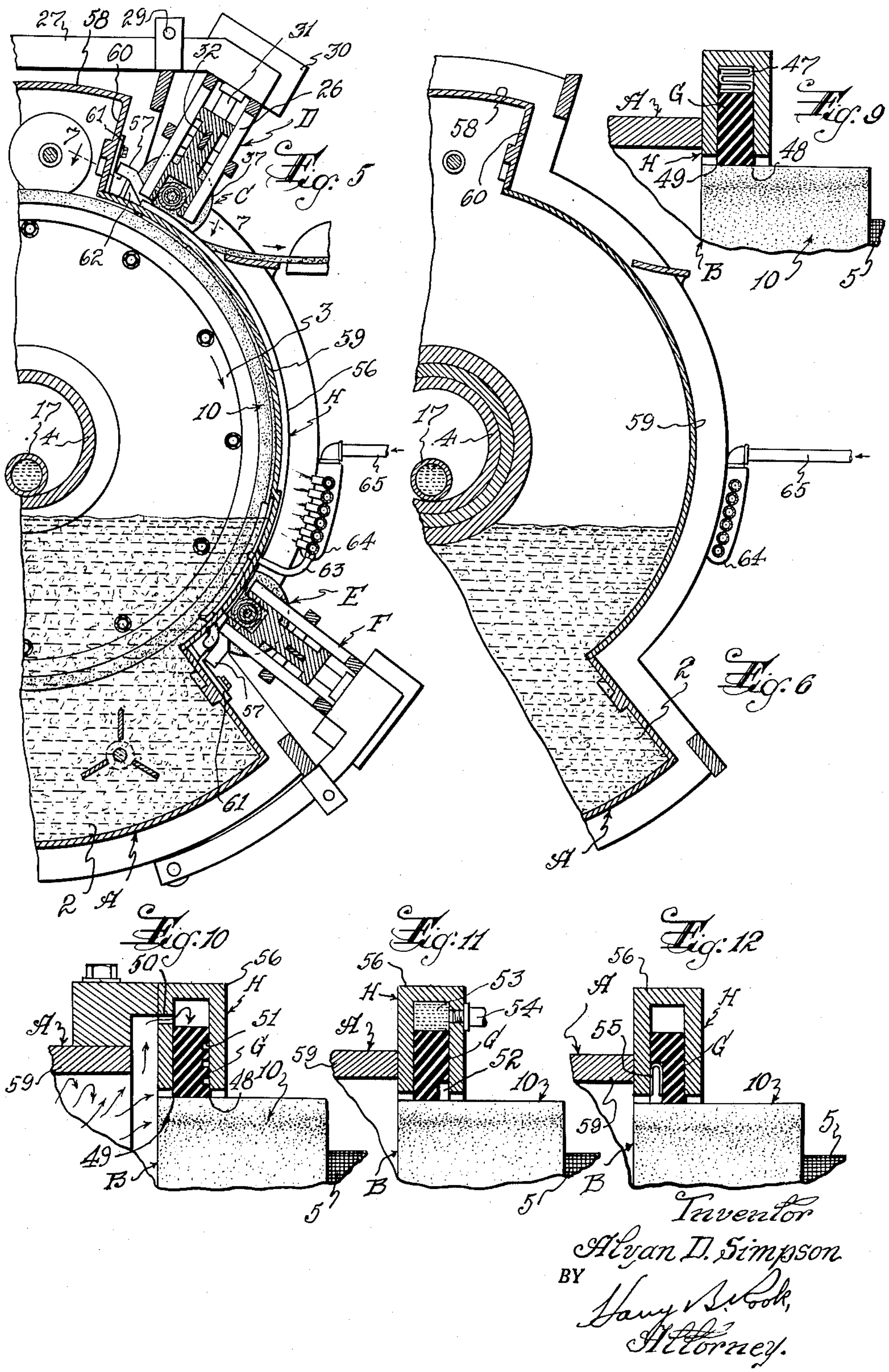
Figure 5 is a fragmentary sectional view on a reduced scale taken approximately on the plane of the line 5—5 of Figure 3.
Figure 6 is a similar view approximately on the plane of the line 6—6 of Figure 3.
Figure 9 is an enlarged fragmentary transverse sectional view approximately on the plane of the line 9—9 of Figure 7, showing the sealing element and its holder.
Figures 7, 8, 13:
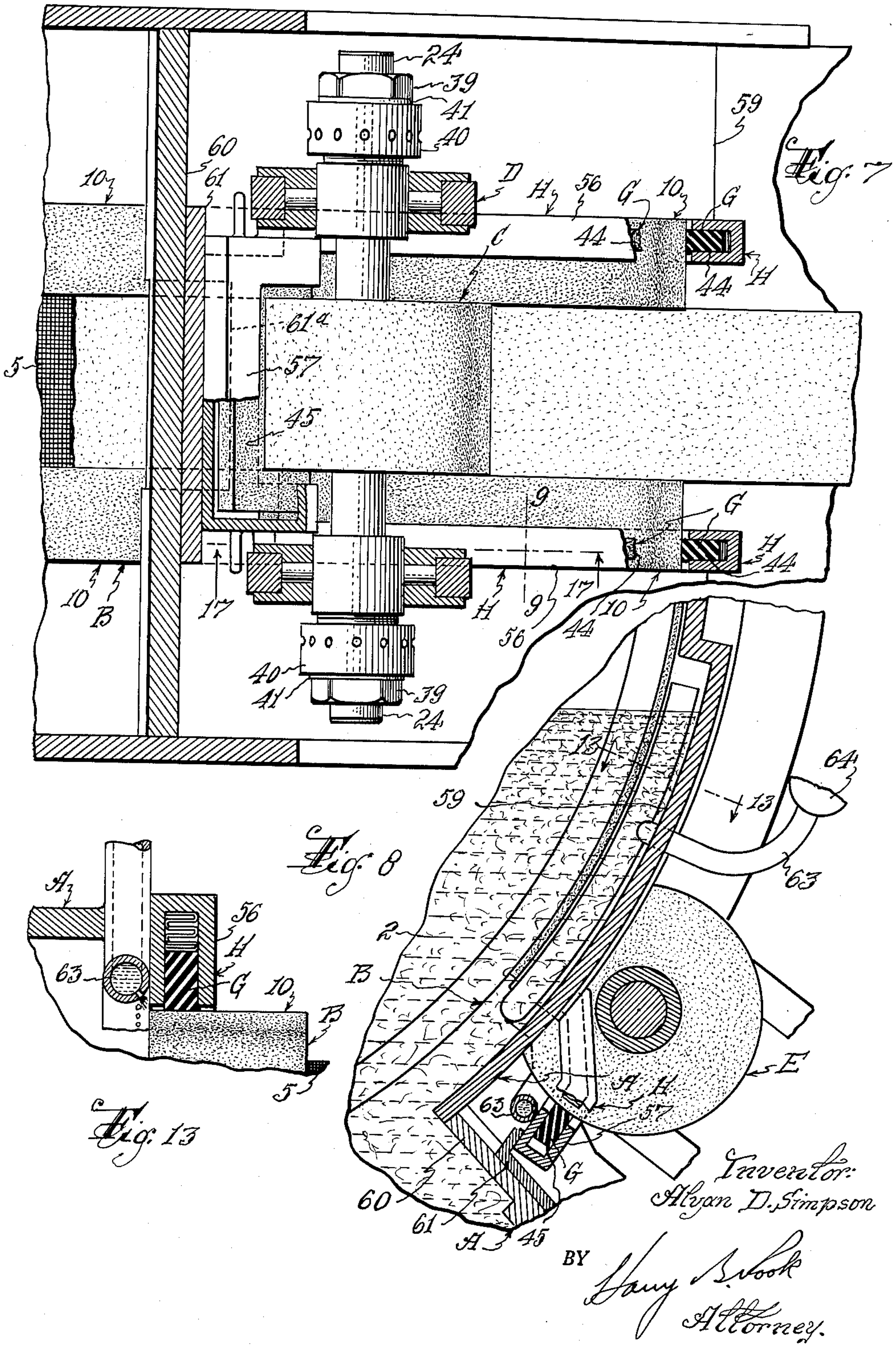
Figure 7 is an enlarged fragmentary horizontal sectional view approximately on the plane of the line 7—7 of Figure 5 with portions shown in plan view and other portions broken away for clearness in illustration.
Figure 8 is an enlarged fragmentary sectional view of the lower roller shown in Figure 5 but with portions omitted and other portions broken away and shown in section.
Figures 17, 18, 19, 20:
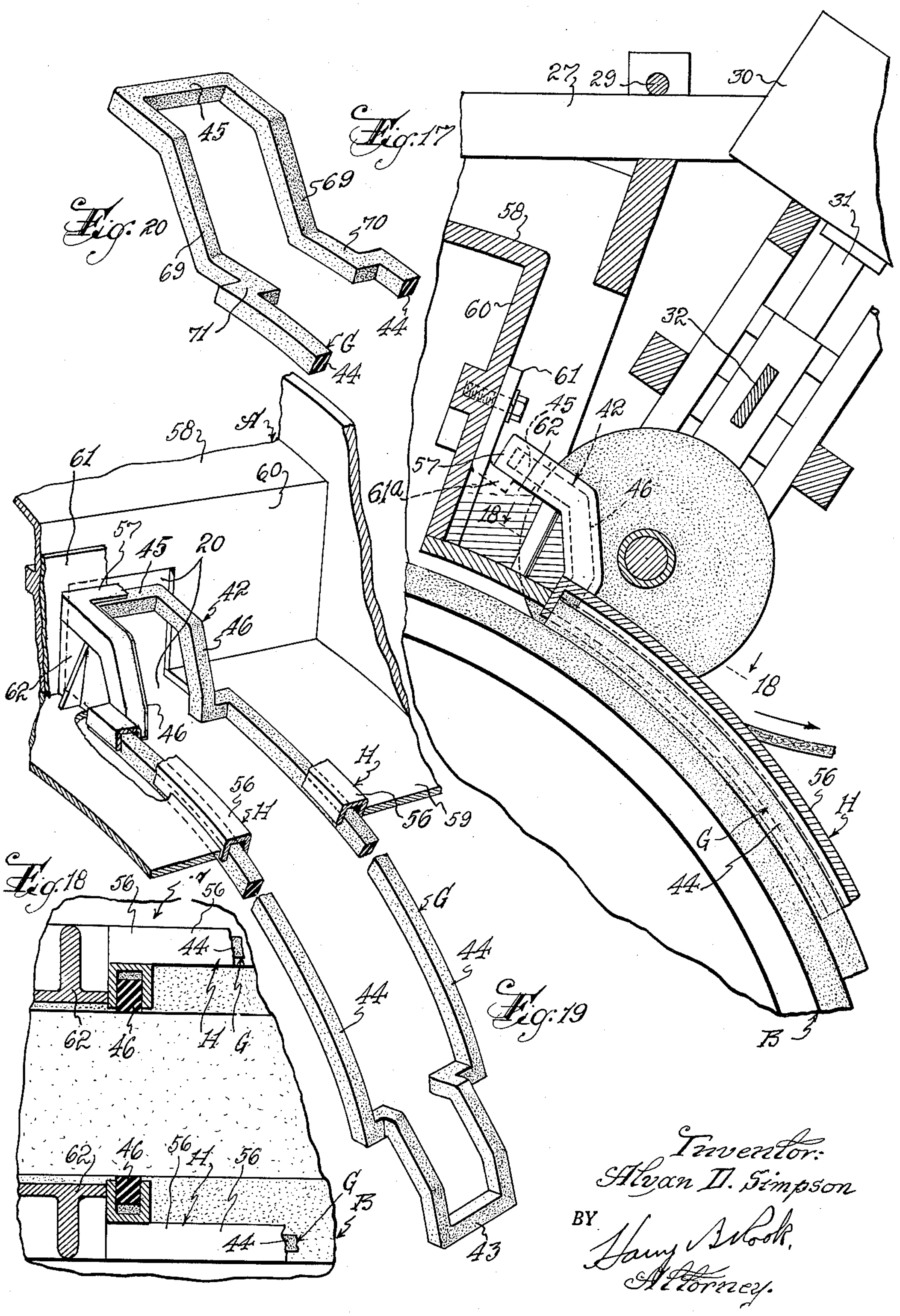
Figure 21:
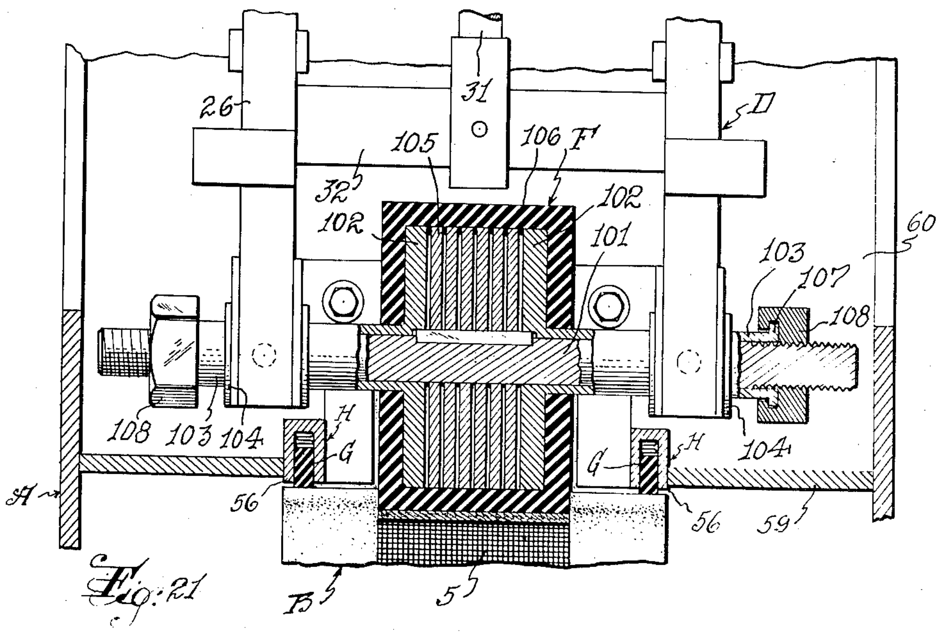
Figures 22, 23:
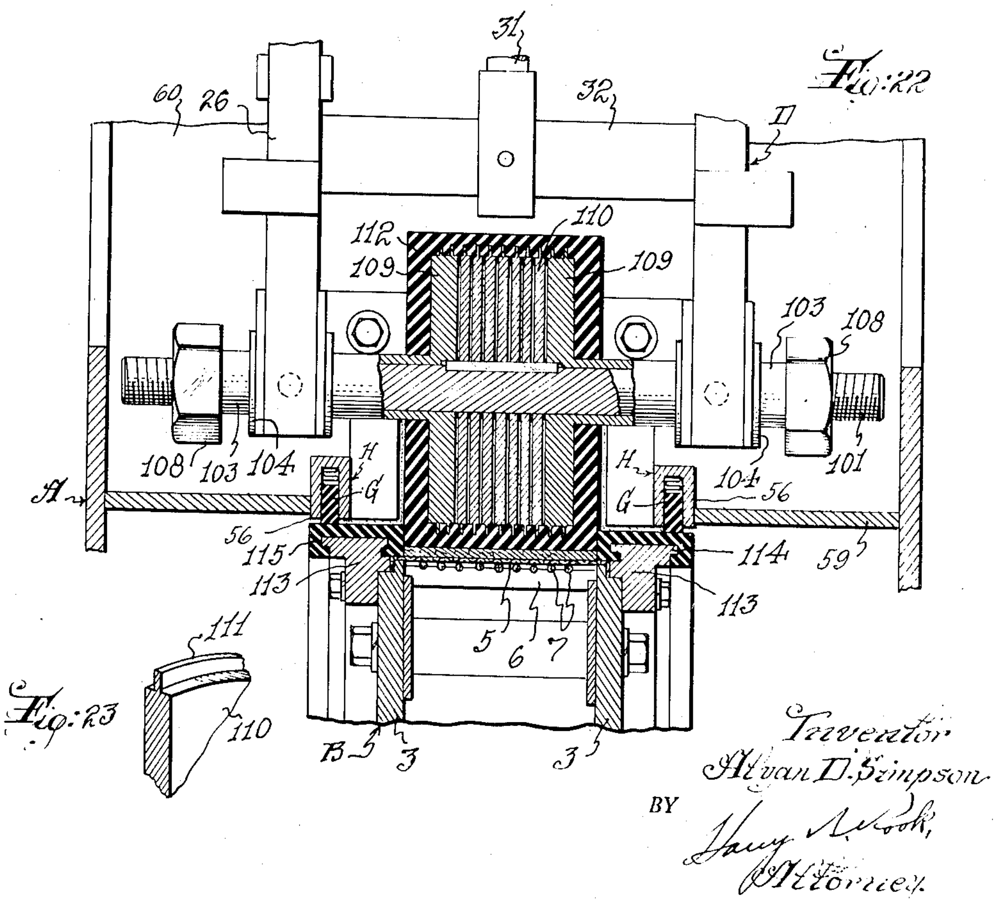
Figure 24:
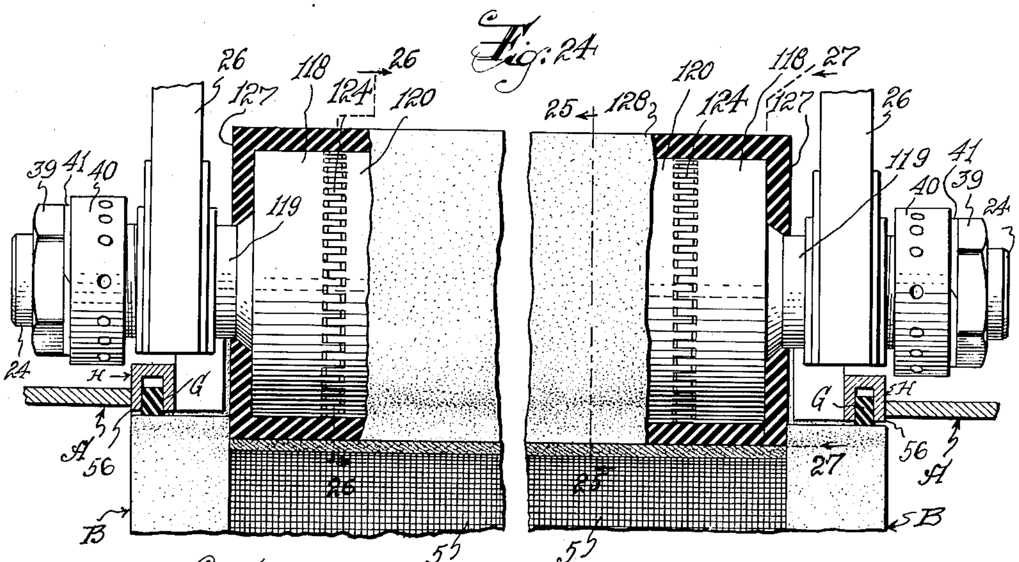
Figures 25, 26, 27:
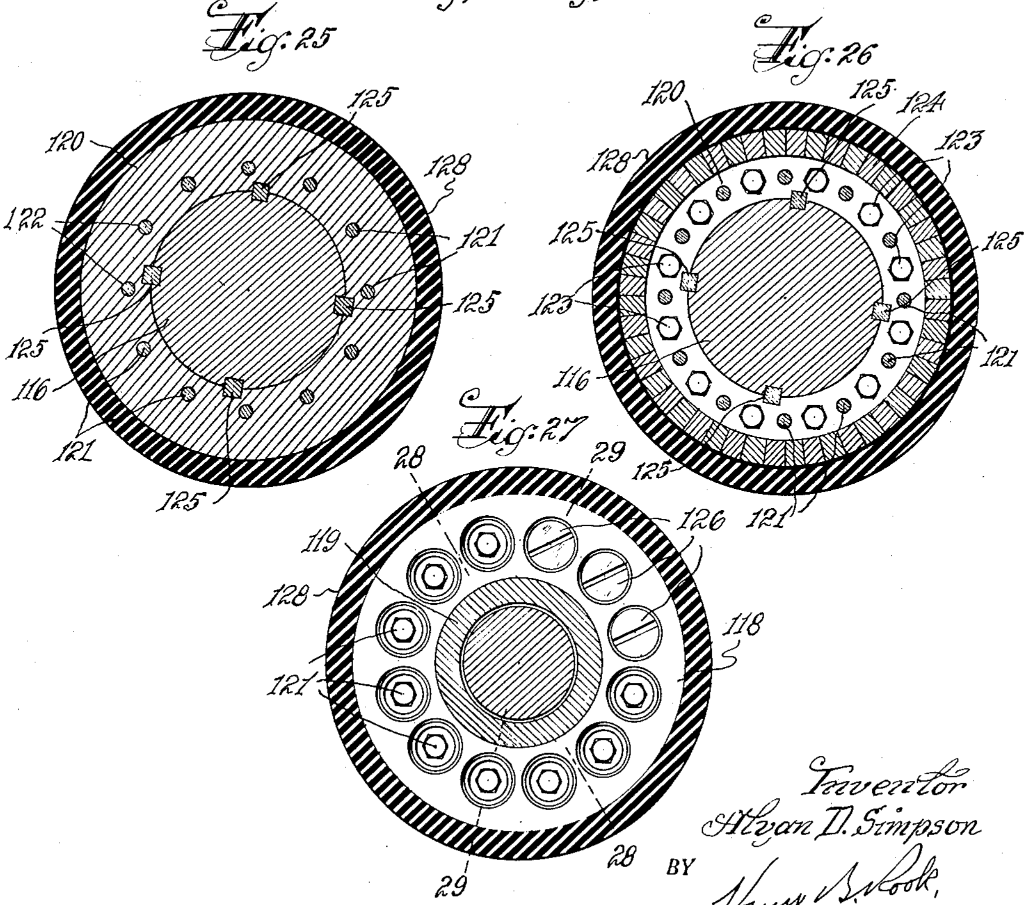
Figures 28, 29, 30:
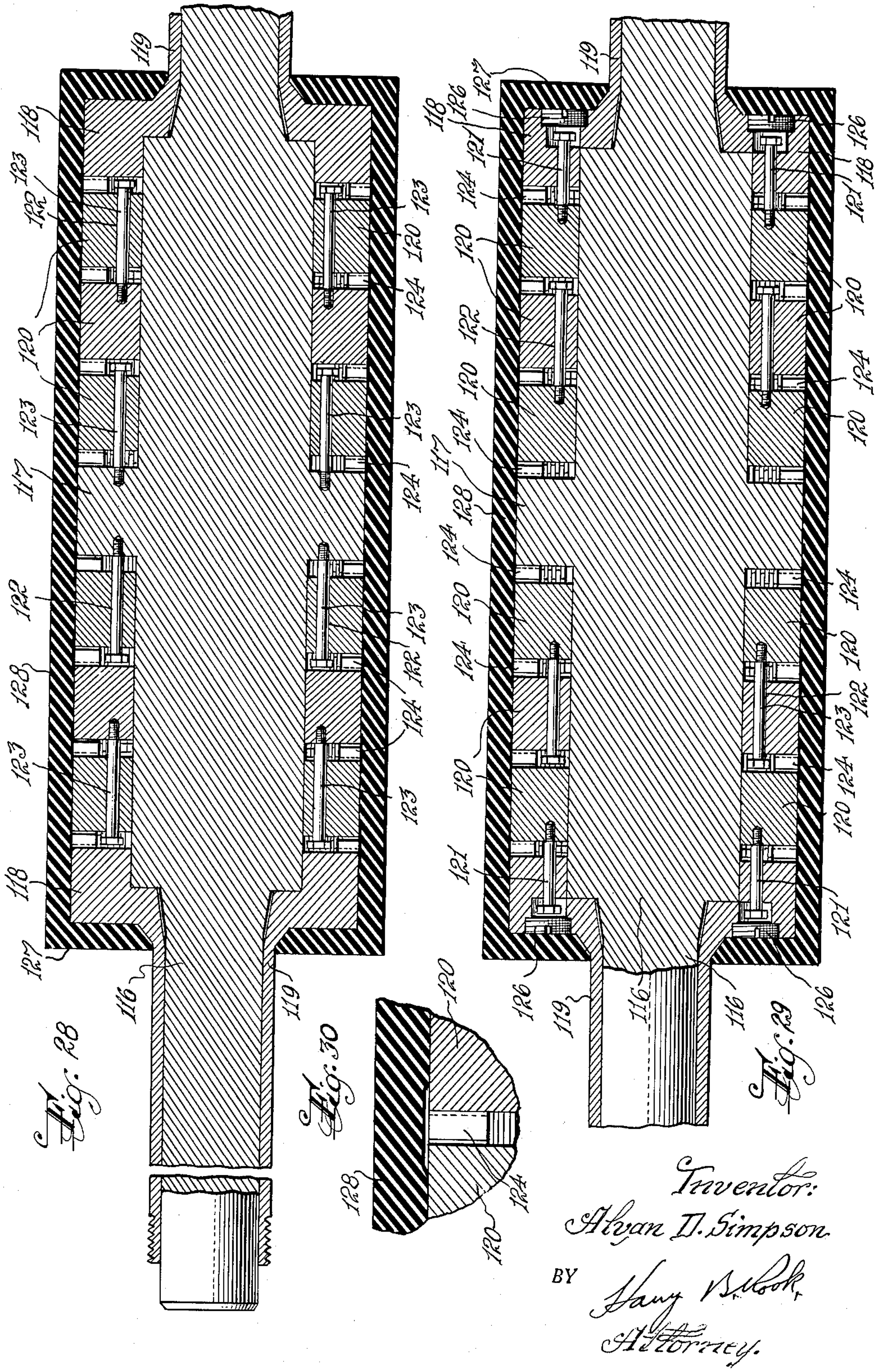
Figure 31:
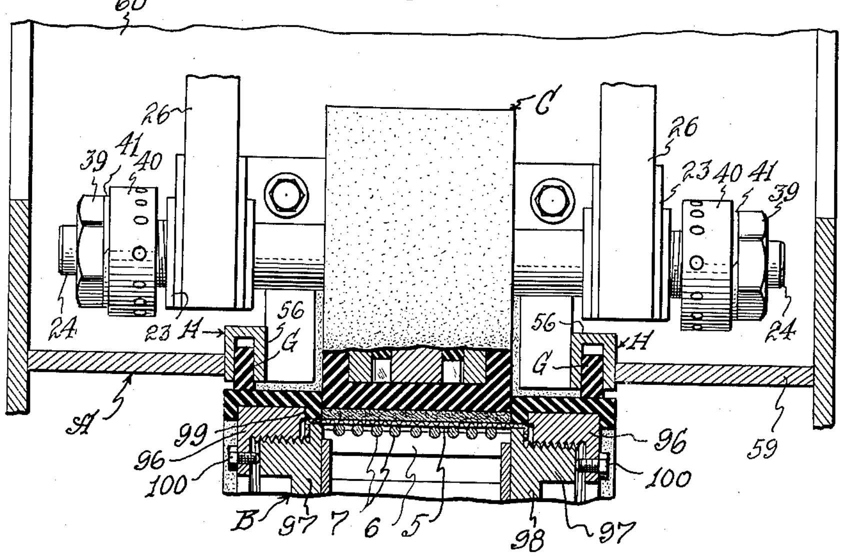
Figure 35:
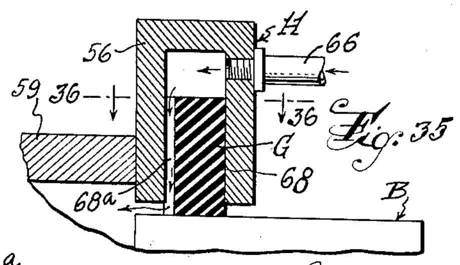
Figure 36:
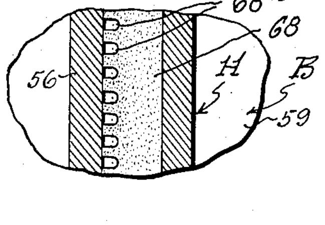
Figures 37, 38, 39, 40, 41, 42, 43, 44:
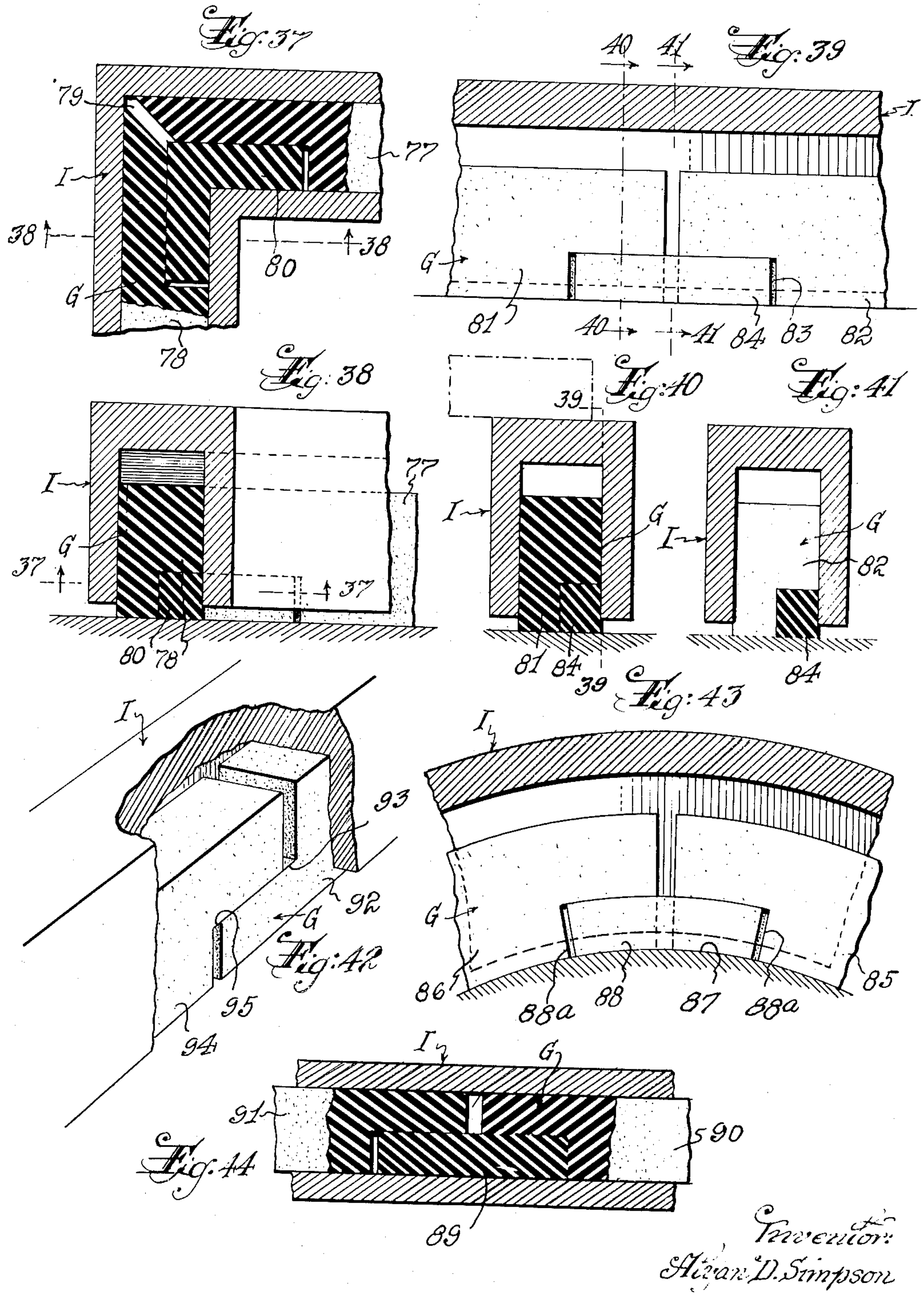
Figures 45, 46, 47, 48, 49, 50:
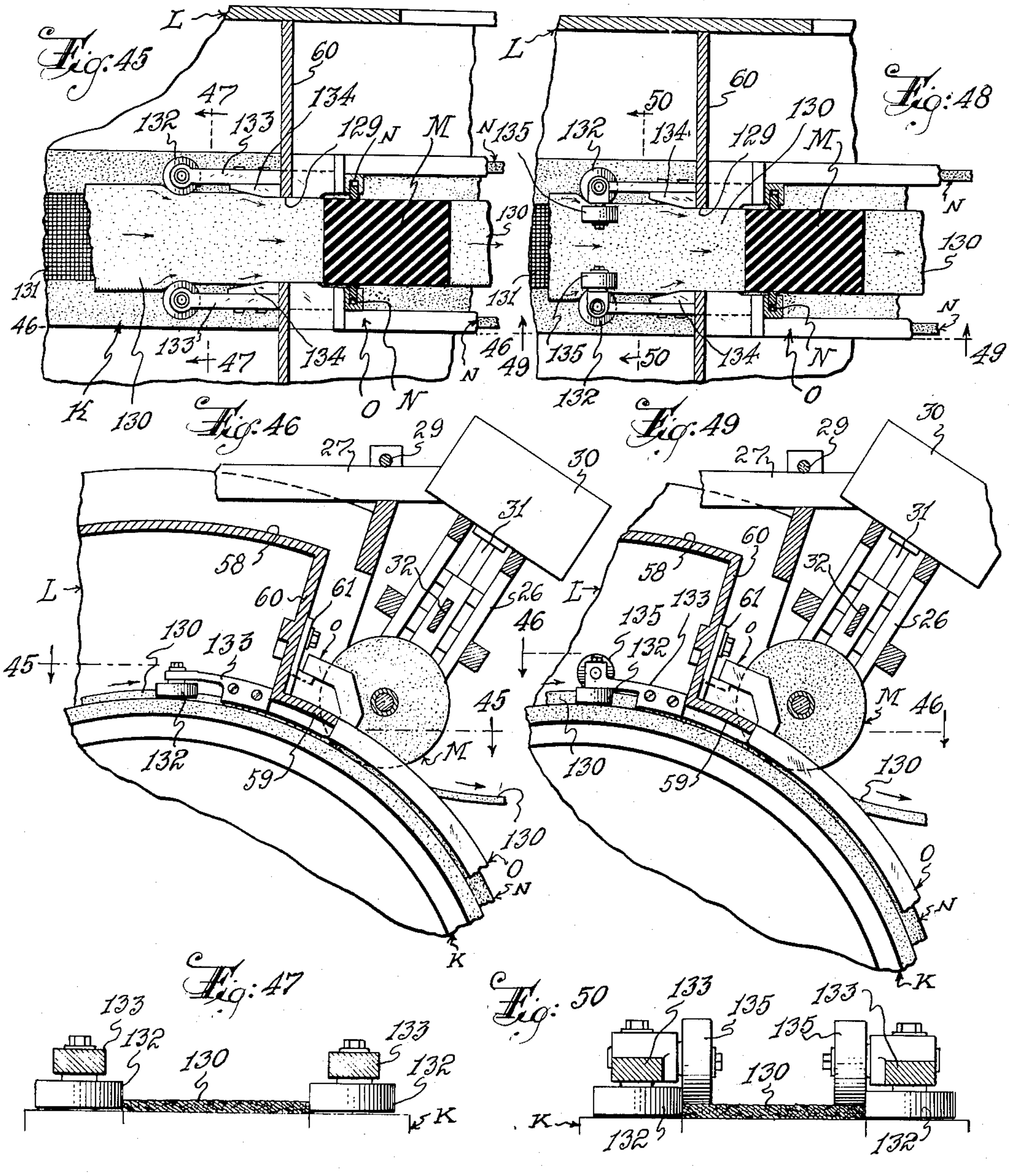

Figures 10 to 12 inclusive are similar views showing modified forms of sealing element and holders therefor;

Figure 13 is a further enlarged fragmentary sectional view approximately on the plane of the line 13—13 of Figure 8;

Figure 14 is a view similar to Figure 7 showing a modification of the sealing element and holder;

Figures 15 and 16 are transverse vertical sectional views on the lines 15—15 and 16—16 of Figure 14;

Figure 17 is an enlarged fragmentary vertical sectional view approximately on the plane of the line 17—17 of Figure 7;

Figure 18 is a horizontal sectional view approximately on the plane of the line 18—18 of Figure 17;

Figure 19 is a fragmentary perspective view of one of the sealing elements and a portion of the holder therefor;

Figure 20 is a fragmentary perspective view of a portion of the sealing element showing a modification thereof illustrated in Figures 14 to 16 inclusive;

Figure 21 is a view similar to Figure 3 showing a modification of the longitudinally adjustable roller;

Figure 22 is a similar view showing another form of the adjustable roller;

Figure 23 is a fragmentary sectional perspective view of one of the discs shown in Figure 22;

Figure 24 is a view in general similar to Figure 3 showing another form of the longitudinally adjustable roller;

Figures 25 to 27 inclusive are transverse vertical sectional views on the lines 25—25, 26—26 and 27—27 respectively of Figure 24;

Figures 28 and 29 are vertical longitudinal sectional views approximately on the planes 28—28 and 29—29 of Figure 27;

Figure 30 is an enlarged fragmentary longitudinal sectional view through the joint between two of the rings of the roller shown in Figures 24 to 29 inclusive, illustrating the stretching of the rubber covering upon elongation of the roller;

Figure 31 is a view similar to Figure 3 showing another modification of the means for adjusting the contacting surfaces of the roller and the shoulders on the drum;

Figures 32 to 35 inclusive are views similar to Figure 9 showing other forms of the sealing element and the holder therefor;

Figure 36 is a horizontal sectional view approximately on the plane of the line 36—36 of Figure 35;

Figure 37 is a horizontal sectional view through another form of the sealing element showing a sliding joint at an angle in the element and its holder;

Figure 38 is a transverse vertical sectional view approximately on the plane of the line 38—38 of Figure 37;

Figure 39 is a vertical longitudinal sectional view approximately on the plane of the line 39—39 of Figure 40;

Figures 40 and 41 are transverse vertical and sectional views approximately on the plane of the lines 40—40 and 41—41, respectively, of Figure 39;

Figure 42 is a perspective view partially in section showing another type of sliding joint in the sealing element;

Figure 43 is a view similar to Figure 39 showing the sealing element molded to conform to a curved surface;

Figure 44 is a horizontal sectional view like Figure 37, showing another modification;

Figure 45 is a fragmentary horizontal sectional view in general similar to Figure 7 showing a modification of the sealing means;

Figure 46 is a vertical sectional view approximately on the plane of the line 46—46 of Figure 45;

Figure 47 is a transverse vertical sectional view approximately on the plane of the line 47—47 of Figure 45;

Figures 48 and 49 are views similar to Figures 45 and 46 respectively showing a further modification of the invention; and Figure 50 is a transverse vertical sectional view on the plane of the line 50—50 of Figure 48.

For the purpose of illustrating the principles of the invention, it has been shown in conjunction with a machine of the type disclosed in the aforesaid co-pending application, Serial No. 24,054, said machine including a tank or casing A that has an inlet 1 for a wet mix 2 of a suitable composition of matter, for example an asbestos and cement composition such as is commonly used in the manufacture of building shingles and sidings or the like. This mix may be of any suitable consistency and generally comprises solid particles, such as asbestos or other fibrous material and cement, suspended in water; and the mix may be supplied to the tank in any suitable manner.

Rotatably mounted about a horizontal axis in the tank is a hollow cylindrical rotor drum B having solid end walls or plates 3 from which project coaxial tubular trunnions 4, and a perforate peripheral wall 5, which may be a screen, connecting said end walls. As shown best in Figures 2*a* and 3, cross bars 6 are mounted in and extend between the plates 3 and have a plurality of circular rings or a helically wound wire 7 seated on their outer edges, the screen in turn being mounted on said rings or helically wound wire. Secured to the side plates 3 and projecting coaxially beyond the screen 5 are end rings 8 that preferably have covers 10 of resilient friction resistant material such as rubber or the like on their outer peripheries and on their inwardly facing ends which form inwardly facing circumferential shoulders 9 disposed in planes perpendicular to the axis of rotation of the drum and extending outwardly beyond the screen 5. Stainless steel rings 8 with shoulders 9 and with no covering have been found to work very well but are expensive to maintain due to wear of or injury to the steel.

Figure 2:
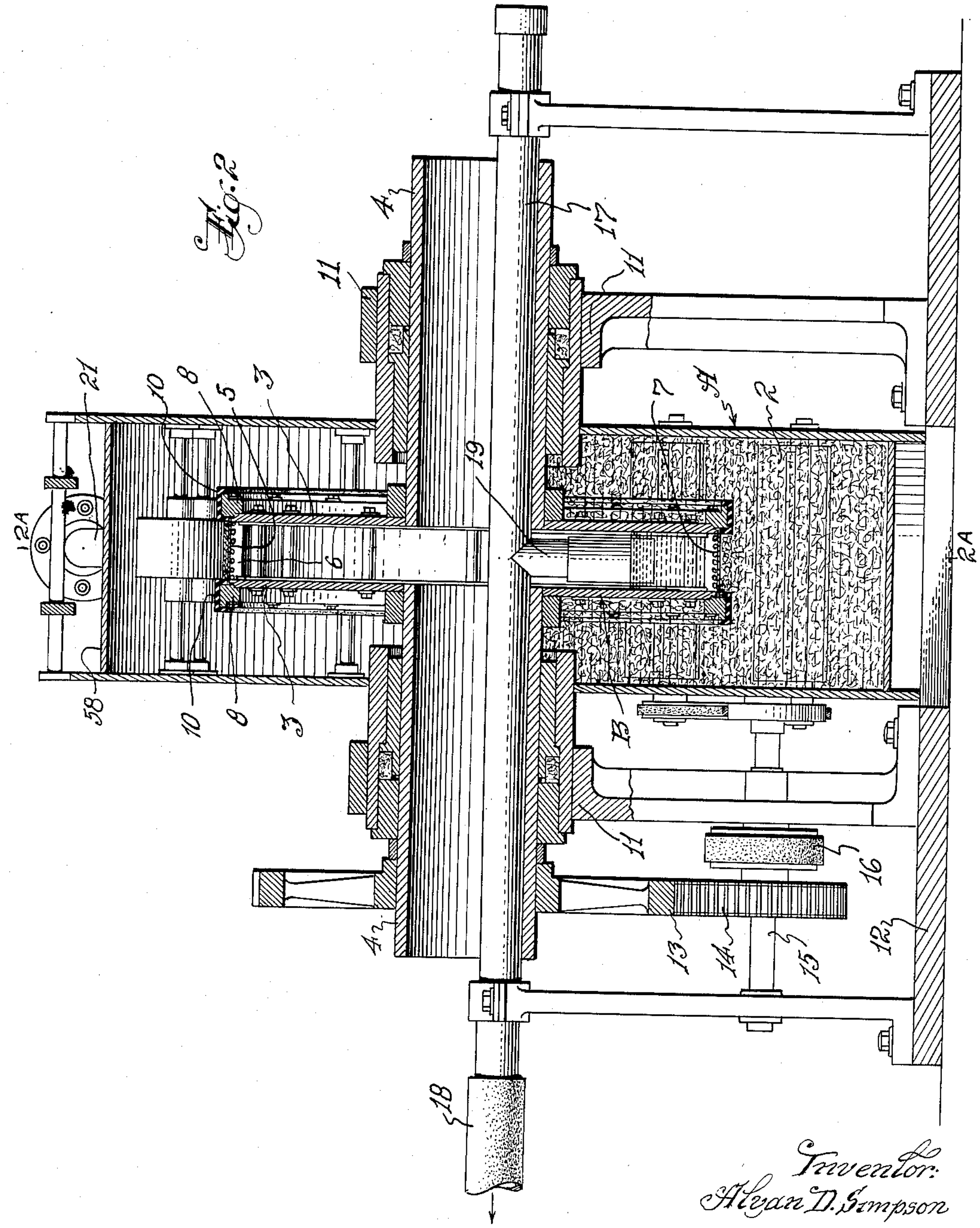
Figure 2 is a vertical longitudinal sectional view through the machine taken approximately on the plane of the line 2—2 of Figure 1.
Figure 2A:
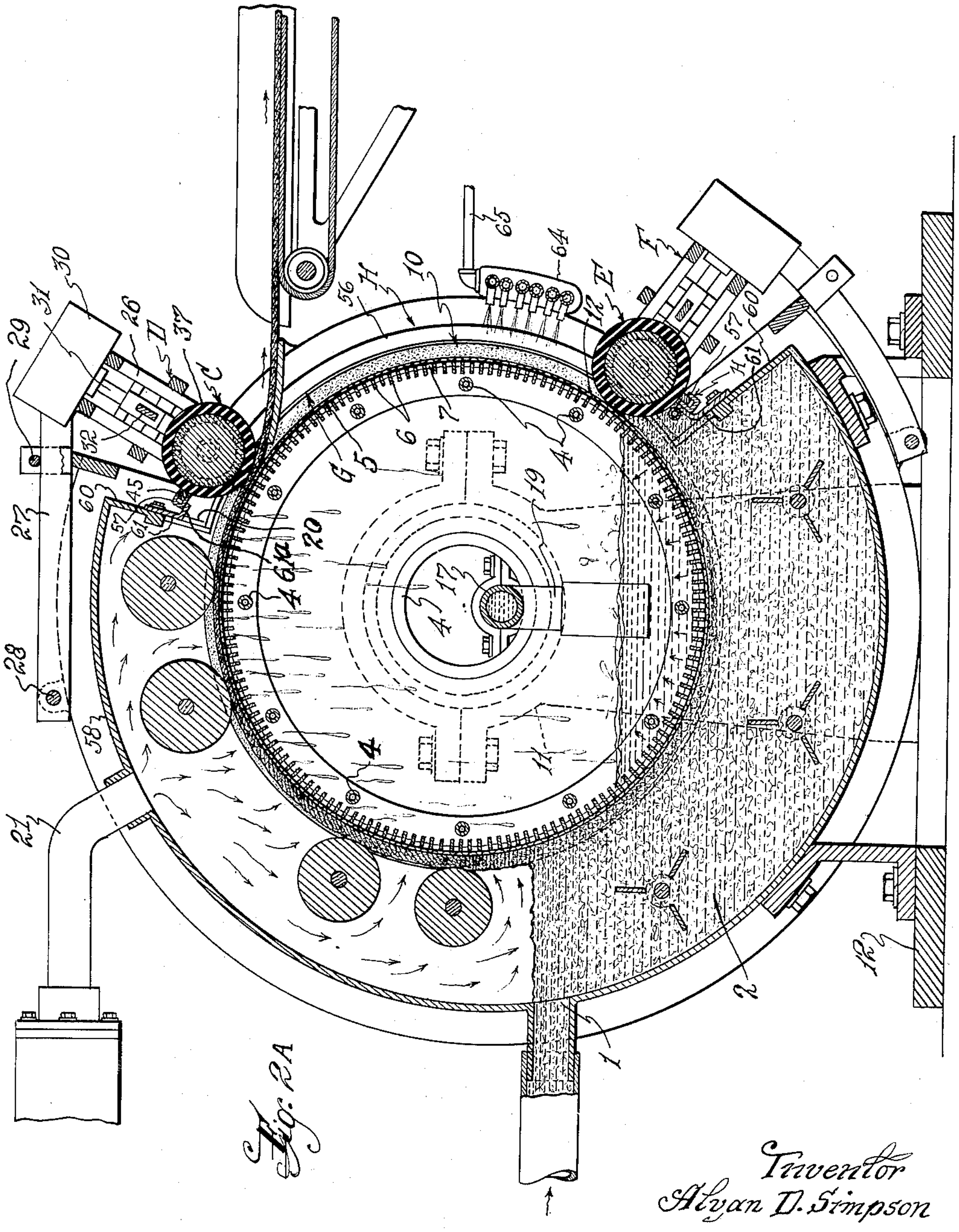
Figure 2*a* is a transverse central sectional view approximately on the plane of the line **2*a*—2*a*** of Figure 2.

The drum is located in the tank so that a lower portion thereof will be submerged in the mix 2 in the lower portion of the tank, as best shown in Figure 2*a*, and the drum may be rotatably mounted in any suitable manner as by journaling the trunnions 4 in bearings 11 that project upwardly from a base 12 on which the tank A is mounted, one of the trunnions being connected by a gear train 13, 14 to a drive shaft 15 which may be connected to any suitable source of power as by a belt and pulley 16.

With this construction, when the drum is rotated through the mix 2, the liquid from the mix will flow through the interstices in the screen 5 so as to cause a deposit of some of the solid matter in the mix on the screen, and as the drum continues to rotate, this deposited solid matter is elevated out of the mix into the upper portion of the tank where the liquid drains from the deposited layer downwardly into the drum from whence the liquid is drained off through the hollow trunnions 4 by any suitable means such as a drain pipe 17 that extends through the hollow trunnions and has one end closed and the other end connected as by a hose 18 to a suitable pump. The pipe 17 has a branch 19 depending between the end plates 3 of the drum into the lower portion of the drum so that liquid may be withdrawn from the drum through said branch into the drainpipe and thence to a suitable discharge point. The layer of solid matter that is disposed on the periphery of the drum is removed through an opening 20 in the circumferential wall of the tank above the level of the mix. Air or other suitable gas under pressure substantially in excess of atmospheric pressure, for example at from fifteen to one-hundred pounds pressure, is supplied to the tank A above the level of the mix, for example from a suitable pump through a pipe 21. This pressure continuously exerted on the surface of the mix tends to accelerate the flow of liquid from the mix through the drum and at the same time to force the liquid from the deposited layer on the upper portion of the drum.

More specifically describing the operation of the machine, the mix is fed into the tank A until the level rises above the roller E at the lower edge of the opening 20. The water showers or sprays are turned on and the rotor drum is started to revolve. As the mix contacts the drum, a very light or thin film of the solid matter in the mix is deposited on the screen because of the small difference in level between the mix in the tank and the water within the rotor drum. When the drum is rotated sufficiently to bring this deposited film under the roller C at the upper edge of the opening 20, the compressed air is supplied through the pipe 21 into the space in the tank above the rotor drum and the mix. The film on the drum prevents the escape of this air through the drum and the opening 20, and as the pressure builds up in said space, the air pressure causes the film to become thicker due to the acceleration of the flow of the liquid from the mix through the perforate drum; and as this film becomes thicker and better seals the screen 5 on the portion of the drum above the mix, it is possible to increase the air pressure above the drum. In this manner, the machine is brought to normal operation and the gas pressure, speed of the rotor drum and the mix concentration, are all adjusted so as to give the required thickness of the deposited layer at the desired production rate. It should be noted that the compressed air in the space above the drum slowly works its way through the deposited layer on the screen 5 and thus forces the excess water out of said layer; and due to the heavy pressure and the relatively small area, there is a marked drying effect.

Figure 1:
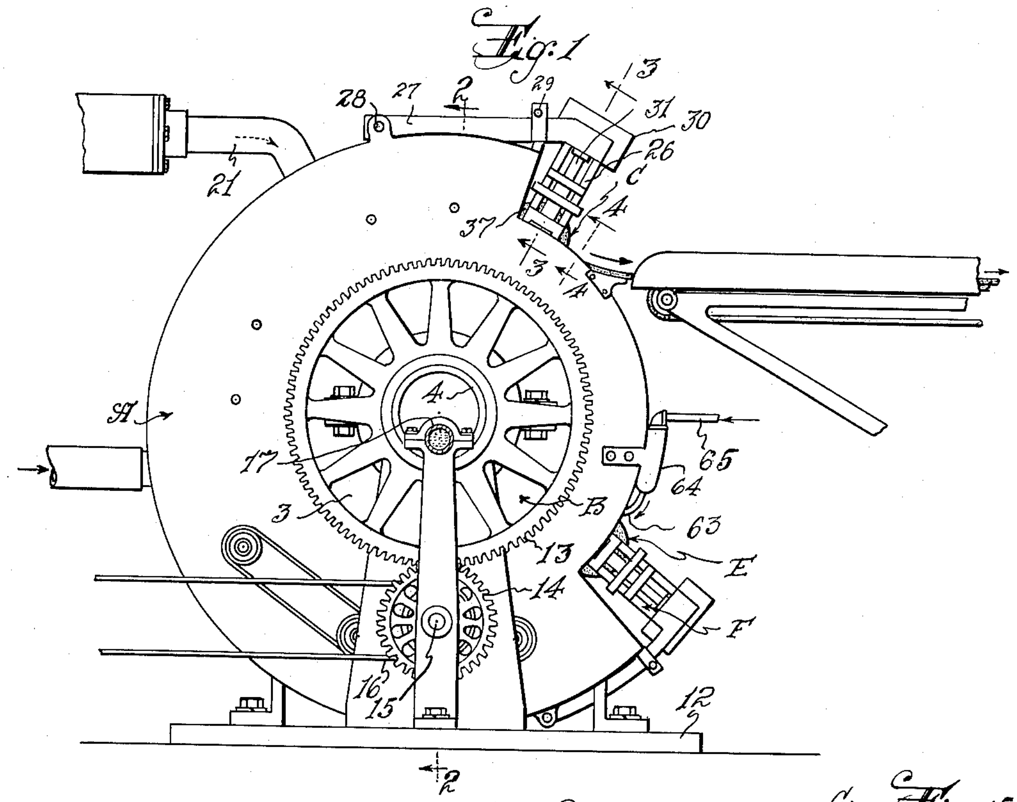

It is a feature of the invention to provide simple and effective means to prevent leakage through said opening 20 of both the wet mix and such air or gas pressure. As shown in Figures 1, 2*a* and 3, a sealing roller C is journaled in a suitable mounting structure D (to be hereinafter more fully described) adjacent the upper end of the opening 20 with its periphery in tight contact with the deposited layer on the screen 5 on the drum and adjustable toward and from the drum. At the other or lower end of the opening 20 is a similar roller E journaled in a mounting structure F that is identical with the structure D, the periphery of said roller contacting with the screen 12 at or preferably below the level of the mix and adjustable toward and from said screen.

The rollers C and E cooperate with the shoulders 9 on the drum to form a part of said sealing means, and preferably the end surfaces of the rollers or said shoulders or both are covered with a suitable resilient friction resisting material, for example rubber or neoprene. As hereinbefore described, the shoulders 9 are formed by a covering 10 on the rings 8, and the rollers C and E which may be identical are provided with a cover of the same or similar material. Furthermore, in accordance with the invention the rollers C and E are lengthwise adjustable, or are longitudinally extendable and contractable so as to obtain and maintain proper contact between the rollers and said shoulders of the drum; and the contact between the roller and the drum is maintained under pressure greater than the pressure inside the tank.

One mechanism for accomplishing these results is shown in Figure 3 and comprises a shaft 22 journaled in bearing sleeves 23 that are rockably mounted on trunnions 24 in bifurcated bearing blocks 25 which are reciprocable in a guide frame 26 which is in turn mounted in any suitable manner on the tank A. As shown, the frame 26 has an arm 27 pivotally connected at 28 to the tank and normally held by suitable releasable locking means 29 in the position to properly locate the roller with respect to the periphery of the drum. A fluid pressure motor 30 is carried by the frame 26 and connected by a piston rod 31 and a cross head 32 to the bearing blocks 25 for normally pressing the rollers into contact with the deposited layer on the drum or with the screen, as the case may be.

The shaft 22 has a peripheral flange 33 rigidly connected thereto, and a circular plate 34 is slidably mounted on the shaft 22 at each of opposite sides of the flange 33, said plates and said flange having interlocking teeth 35 for causing the flange and plates to rotate together. Between the plates and the flange are resilient cushion rings 36 for normally influencing the plates away from the flange, and a resilient cover 37 of rubber or the like is applied to the peripheries of the plates and said flange and to the end surfaces of said plates. The plates 34 are movable longitudinally of the shaft to extend the roller, and as shown each plate has a coaxial tubular extension 38 that is slidable in the corresponding bearing sleeve 23 and has a nut 39 screwed on its end outwardly of the corresponding bearing sleeve. Another nut 40 is screwed on the end of the bearing sleeve and has a flange in juxtaposed relation to the nut 39, there being preferably a friction washer 41 between the two nuts. With this construction, by rotating the nuts 40 in the proper direction the plates 34 may be pulled away from the flange 33 so as to stretch the cover 37 on the roller and hold it in fluid tight contact with the covered shoulders 9 on the drum, the teeth 35 remaining interlocked as shown in Figure 4 to ensure that the plates and flange shall rotate together.

For sealing the junctions between the walls of the tank, and the rollers and drum, a sealing element G formed of rubber, neoprene or other suitable material and best shown in Figure 19, is mounted in a suitable holder H which is welded or otherwise secured in fluid tight relation to the walls of the tank. The sealing element G is shown in the form of an elongate generally rectangular ring having two generally U-shaped end portions 42 and 43, one for each of the rollers C and E, which are connected by side portions 44 that are longitudinally curved in one plane to conform to the periphery of the drum outwardly of the shoulders 9. Each end portion has a transverse part 45 to engage the periphery of the corresponding roller, said part being of a length equal to that of the roller and being connected to parts 46, each to engage one end of the corresponding roller, said parts 46 being connected to the corresponding ends of the side portions 44. The holder H is generally similarly shaped and is channel-shaped in cross section with its channel facing with the sealing element seated in its channel and projecting outwardly beyond the side flanges thereof as shown for example in Figures 2*a*, 3, 7, 8, 17, 18 and 19.

Figure 32:
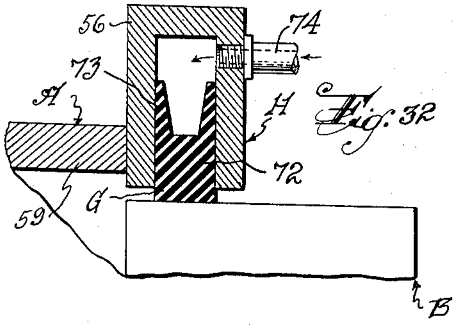

The form of the sealing element G may be varied as shown in Figures 9 to 12 inclusive and 32 to 36 inclusive. In Figures 9 and 19, the sealing element is shown as rectangular in cross section with one face contacting at different portions of its length with the periphery of the drum, with the ends of the rollers and with the peripheries of the rollers, respectively, as shown in for example Figures 7 and 9. Preferably the side portions of the sealing element will be molded to accurately conform to the curvature of the drum periphery, and springs 47 are interposed between the sealing element and the holder to normally influence the sealing element into contact with the juxtaposed surfaces of the drum and rollers. The springs may be formed of several integral layers of spring metal, but when used on curved surfaces of the sealing element all of the layers except that in contact with the holder will be slit transversely to permit the spring to accurately conform to such surfaces. Instead of springs, inflated rubber tubes could be used. Also, if the sealing element G has a shape as shown in Figure 32 or fits closely in the holder, the element G may be made to contact the surface by placing compressed air in the holder above element G. When operating at heavy tank pressures the leakage of the machine pressure past the inner vertical face of the sealing element G has been found sufficient to prevent leakage. When no spring is used, the pressure in the holder above G has to be at least equal to or greater than pressure within the tank; otherwise the tank pressure will lift element G and cause leakage.

When the sealing element is installed one edge faces into the tank as indicated at 49 in Figures 9 and 10 while the opposite edge 48 is exposed to the atmosphere and apertures 50 are provided sometimes in the holder H behind the sealing element to permit the air pressure in the tank to enter the holder behind the sealing element as shown in Figure 10 and take the place of or supplement the springs. It has been found with this arrangement that the pressure in the tank tends to leak beneath the inner edge 49 of the sealing element but is balanced by the pressure behind the sealing element except at a small zone adjacent the outer edge 48 of the sealing element. This action ensures a fluid tight contact of the sealing element with the juxtaposed parts of the rollers and drum but reduces the frictional resistance and wear of the parts to the minimum.

As hereinbefore indicated, it is desirable to have the contacting parts of the sealing means formed of rubber or similar material, it having been found easier to maintain a seal in this way between two contacting rubber parts than between, for example, a rubber part and a steel part. However, it is desirable to lubricate the contacting surfaces and it has been found that various substances will serve the purpose, for example castor oil, soya bean oil and soapy water, but it is sometimes desirable to use a light mineral oil as it has been determined this will not stain the finished asbestos cement product. It is probable that there are plastic compositions that would serve in place of the rubber and could be lubricated with water, as well as with lubricating liquids or solids.

The lubricant can be applied in any suitable way, but when the frictional pull on a sealing element is in a direction lengthwise of the element, for example on the side portions 44 that contact with the drum periphery, the lubricant can be placed at the entering end, although sometimes it is necessary to introduce the lubricant at intervals along the length of the sealing element through holes in the holder, for example like pipe 74, Figure 32 but it is usually also necessary to make small vertical holes through the center of the seal section 72 to lead the lubricant to the two sliding contact surfaces. This method of introducing the lubricant results in a more efficient and thorough application of the lubricant to the sealing surfaces than could be accomplished by attempting to insert the lubricant at the edges of the contacting surfaces where a squeegee effect would tend to prevent the lubricant from entering between the contacting surfaces.

Also, when the direction of pull resulting from friction on the sealing element is lengthwise of the latter, the sealing element should be positively held at spaced points in its length to prevent it from following the moving part such as the drum.

Sometimes it is desirable to grease or lubricate the contacting surfaces of the sealing element and the outside flange of the holder, and for this purpose the sealing element may be formed with grooves 51 in its outer surface as shown in Figure 10. By notching the outer side of the sealing element as indicated at 52 in Figure 11, the force of the contact of the sealing element with the outer flange of the holder and with the moving part such as the drum, may be increased.

Also, it may be desirable to inject liquid into the holder behind the sealing element from any suitable source through a pipe 54. For example, it may be particularly desirable to cause flow of water behind the sealing element that is below the mix level.

Sometimes when the machine operates at low pressures, it is desirable to have a spring to force the sealing element against the outside leg of the holder, for example a spring 55 as shown in Figure 12 of the drawings.

Now more specifically describing the illustrated embodiment of the holder H for the sealing element and with particular reference to Figures 7 and 17 to 19, inclusive, the holder includes channel-shaped side portions 56 corresponding in length to the side portions 44 of the sealing element, the side portions 56 being connected to end parts 57 in which are seated the end portions 42 and 43 of the sealing element. Side walls of the tank are shown as comprising two arcuate portions 58 and 59 the latter of which is of a smaller diameter than the portions 58, said arcuate portions being connected by approximately radial portions 60. The opening 20 extends through the length of the arcuate portion 59 and has its end portions extending into each of the radial wall portions 60. A bracket plate 61 is secured to each radial wall portion 60 and has an opening in register with the portions of the opening 20 in the radial wall portions 60; and said bracket plate also has an outturned flange 61*a* to which the corresponding end part 57 of the sealing element holder H is welded or otherwise secured with a fluid tight joint. The side portions 56 of the holder are secured with a fluid tight joint to the longitudinal edges of the opening 20 in the arcuate wall portion, and side plates 62 are secured with fluid tight joints to the bracket plate 61, the corresponding end part 57 of the holder and an arcuate wall portion 59. Thus, when the rollers C and E are in their normal positions and contacted by the end portions 42 and 43 of the sealing element, and the side portions 44 of the sealing element are in contact with the circumferential surface of the drum B, the opening 20 is tightly sealed against leakage of fluid from the tank outwardly through the opening.

In many cases and particularly when the sealing element is in direct contact with the wet mix, to prevent the passage of solid material between the sealing element and the surface in contact therewith, such as would cause rapid wear of the contacting surface, it is sometimes desirable to have a water or liquid spray directed at the edge of the contacting surfaces. This can be done as shown in Figure 8 where is shown a spray pipe 63 that may be connected to a source of supply through a manifold fitting 64 to which is connected a pipe 65 from the liquid supply.

Slight modifications in the shape of the sealing element and holder are shown in Figures 14 to 16 inclusive and Figure 20. The main differences between the two forms is that the side part 69 of the end portion of the element shown in Figure 20 joins the side portions 70 at an obtuse angle instead of the acute angle of juncture of the side parts 46 with the side portions 44 of the sealing element shown in Figure 19; and the offsets 71 of the side portions 70 are positioned intermediate the lengths of the side portions instead of at the juncture of the side portions 44 and the side parts 46 of Figure 19.

Figure 34:
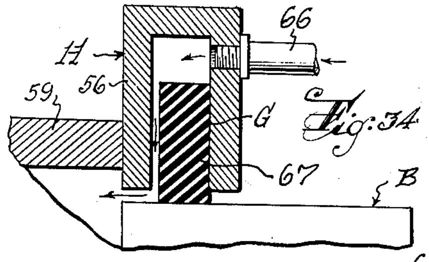

Instead of utilizing the spray pipe 63, the same results may be accomplished by making the sealing element of a width less than the distance between the side flanges of the holder H as shown in Figure 34, and conducting liquid into the holder behind the sealing element as by a pipe 66 so that water will flow between the sealing element 67 and the inner flange of the holder past the zone of juncture between the sealing element and the surface contacted thereby. Instead of making the sealing element narrower than the holder, the inner face of the sealing element 68 may be provided with transverse grooves 68*a* as shown in Figures 35 and 36 to permit the desired flow of water.

The form of the sealing element may be widely varied as hereinbefore indicated and Figure 32 shows another modification of the sealing element where the top edge of the sealing element 72 is provided with flexible side flanges 73 which may readily adapt themselves to variations in the contour of the side flanges of the holder. Fluid pressure may be applied to the flanges 73 through a pipe 74 that leads into the holder behind the sealing element.

Figure 33:
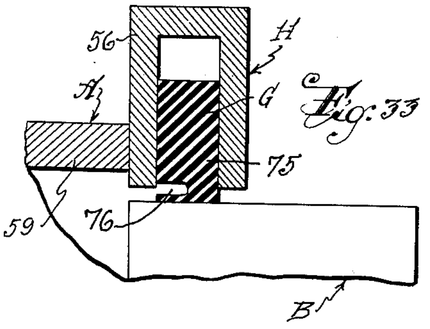

In Figure 33 the sealing element 75 is provided with a groove 76 on its inner surface and close to the sealing surface so that the sealing surface may conform to for example a roughened surface on the drum. Furthermore, the lip formed by the groove 76 more readily maintains contact with the circumferential surface of the roller C or E when the roller moves up and down due to changes in the thickness of the deposited layer on the drum.

In some instances it may be desirable to make the sealing element in a plurality of pieces having sliding joints between them, particularly when it is desired to permit the sealing element to shift to conform itself to the surface with which it is in contact. Various forms of sliding joints are shown in Figures 37 to 44 inclusive and Figures 37 and 38 show a corner joint, for example at the offset between the side portions and the end portions of the sealing element. In these figures, the reference character I designates the holder in which two sections 77 and 78 of the sealing element are fitted. The ends of said sections are mitered as indicated at 79 and portions of said sections are cut away to form rabbets in which is fitted a right angular section 80 one side of which forms a part of the sealing surface of the sealing element as best shown in Figure 38. With this construction the two sections 77 and 78 may slide relatively to the section 80 and the section 80 will maintain the seal at the joint between the sections.

In Figures 39 to 41 is shown a similar joint for a straight side of the sealing element, the juxtaposed end portions of the sections 81 and 82 being notched or recessed at 83 to receive a section 84. The two sections 81 and 82 may slide relatively to the section 84 which will maintain the seal at the joint.

In Figure 43 is shown a similar joint for a sealing element used on a curved surface. In this case the sections 85 and 86 preferably will be molded to conform to the shape of the curved surface 87 such as the circumferential surface of the drum, and a joint section 88 is seated in recesses 88a in the ends of the sections 85 and 86.

In Figure 44 the joint section 89 is adhesively secured in the recess of the section 90 so that the relative sliding takes place only between the joint section 89 and the other section 91.

Figure 42 shows the section 92 provided with an upwardly facing rabbet 93 while the other section 94 has a downwardly facing rabbett 95 so that the sliding action occurs directly between the two sections.

As hereinbefore stated, the seal between the rollers C and E can be effected in different ways, an extendable roller having a rubber covering constituting one way. In Figure 31 is shown another manner of maintaining the seal between the drum shoulders and the roller, and as indicated in this figure the roller may be extendable also but it need not be extendable. In this form of the invention, the end rings 96 on the drum are screw threaded on bosses 97 carried by the end plates 98 of the drums so that the rings may be adjusted longitudinally of the drum to adjust the contact between the covered shoulders 99 and the end of the roller C. Set screws or other suitable means 100 may be provided for locking the end rings in adjusted positions.

The invention also contemplates various types of extendable rollers and Figures 21 to 30 illustrate modifications of the extendable roller construction. In Figure 21 the roller F includes a shaft 101 on which are slidably mounted two circular plates 102 each of which has a tubular hub or sleeve 103 projecting from one side thereof in coaxial sliding relation to the shaft and journaled in a bearing sleeve 104 that may be identical with the sleeve 23 shown in Figure 3. Between the plates 102 and keyed on the shaft to rotate therewith but to move longitudinally relative thereto, are a plurality of flat rings 105. The plates 102 are covered at their ends and at their circumferential surfaces and the rings 105 have their circumferential surfaces covered by an elastic covering 106, such as rubber or neoprene so that the cover will stretch upon separation of the plates 102 and the circumferential portion of the cover will be supported by the edges of the plates and of the rings 105. Any suitable means may be used for adjusting the plates 102, but as shown each sleeve 103 has a circumferential flange 107 which has a swivel connection with a nut 108 that is screwed on the shaft 101.

A modification of the extendable roller is shown in Figure 22, where the construction is in general similar to that shown in Figure 21 but the end plates 109 and the discs 110 have narrow circumferential ribs 111 that are embedded in the cover 112, whereby the cover is more uniformly and positively interlocked with the plates and rings.

This Figure 22 also shows a modification in the covering of the end rings 113 on the drum, said end rings having coaxial flanges 114 interlocked with the covers 115 which preferably are molded onto the end rings.

This structure may be preferred to that shown in Figure 3 because the contacting surfaces of the covered shoulders of the drum and the end surfaces of the rollers, are subjected to the abrasive material of the mix, especially where the roller is submerged in the mix, and substantial pressure is maintained between the contacting surfaces of the shoulders and the rollers; and therefore the elastic abrasive resisting substances, such as rubber, and a firm attachment of such covers to the drum shoulders, are especially necessary. The rubber can be easily ground true to shape and trued up after it is in place so that it is relatively easy to maintain a sealing contact between the rubber covers of the rolls and the drum and also between the rubber covers of the drum and the sealing element.

Figures 24 to 30 illustrate another extendable roll which comprises a shaft 116 having a circumferential flange 117 intermediate its ends at opposite sides of which are circular end plates 118 for the roll, each of which has a coaxial tubular extension 119 slidable on the shaft. These tubular extensions may be connected to any suitable means for adjusting plates 118, for example like the means shown in Figure 3 for adjusting the plates 34. Between the circumferential flange 117 and each end plate 118 are a plurality of rings 120 one of which is connected to each of the end plates 118 for movement relatively to and with said end plates longitudinally of the shaft. As shown, said connection between the end plates and one of said rings 120 comprises a plurality of screws 121 screwed into the ring 120 and loosely slidably passing through an opening in the end plate with lost motion between the end plate and the head of the screw as best shown in Figure 29. One ring at each side of the flange 117 is connected to said flange by similar screws 122 with a lost-motion connection between the rings and the heads of the corresponding screws; and each of the rings 122 is connected to an adjacent ring by other screws 123 as shown in Figures 28 and 29. The end plates, the flange 117 and the rings 120 have interlocking longitudinally extending teeth 124 so that the rings and plates may move relatively to each other longitudinally of the shaft but will be constrained by the teeth 124 to rotate together. The rings and plates are keyed on the shaft for longitudinal movement relatively thereto but for rotation therewith as by means of keys 125. The recesses for the heads of the screws 121 in the end plates are closed by screw plugs 126 so as to provide smooth end surfaces for the roll and for properly supporting the end portions 127 of the elastic cover 128 of the roller which extends over the circumferential surfaces of the end plates, the rings and the flange. It will be observed that the teeth 124 form supports for the elastic cover at the joints between the rings, end plates and flange.

In operation, to elongate the roll, the tubular extensions 119 are pulled apart, the elastic cover 128 being thereby stretched and permitting the end portions 127 of the cover to be brought into snug contact with the shoulders on the drum. Preferably the cover 128 will be fast connected to the peripheral surfaces of the rings, plates and flange except across the joints between said parts, as shown in Figure 30, where the cover will be free, although if desired the cover may be slidably related to said circumferential surfaces throughout the length thereof.

Hereinbefore, the sealing means has been described in conjunction with a drum having shoulders like the shoulders 9 between which the rollers are arranged, but the invention also contemplates sealing mechanism for use with drums devoid of such shoulders or having a straight cylindrical surface throughout. Such a construction is shown in Figures 45 to 50 where the drum is designated by the reference character K which may be journaled in a tank L identical with the tank A and be in general the same as the drum B except that it has no shoulders like the shoulders 9. The tank has an opening 129 like the opening 20, and a roller M like the roller C as well as another roller (not shown) like the roller E. Also, a sealing element N mounted in a holder O, like the element G and the holder H engages the ends and periphery of the roller M and the cylindrical surfaces of the drum beyond the edges of the screen to prevent the escape of fluid pressure through the opening 129.

It will be observed that the shoulders on the drum in the construction hereinbefore described, define and form the side edges of the layer deposited on the drum, and where a drum without such shoulders is utilized, the edge of the deposited layer will be rough and possibly extend somewhat over the edges of the screen on the drum as indicated in Figure 45 where the deposited layer is designated 130 and the screen is 131. In accordance with the invention, in order to provide somewhat straight edges on the deposited layer, a roller 132 is journaled on a bracket 133 within the tank at each side of the deposited layer so that as the layer 130 moves toward the opening 129 the rough edges of the layer will be engaged by the rollers and thereby straightened and smoothed. It may be desirable to provide also inclined or beveled surfaces 134 on extensions of the sealing element N between the rollers 132 and the roll M to more exactly line up the edges of the deposited layer with the end faces of the roller M. Obviously with thin layers the rollers 132 may be omitted and instead of such rollers another inclined surface like the surface 134 could be provided.

Under some conditions, it is satisfactory to have only the one extension of the sealing element having the inclined surface 134. The inclined surface 134 not only lines up the edge of the film but also holds, retains or supports the edges of the film as it passes under roll M and seals the pressure in the tank. With thick layers it may be desirable to have an additional roller 135 to engages the top of the deposited layer adjacent the rollers 132 to keep the top surface from bulging under the pressure exerted by the rollers 132.

I claim:

1. The combination of a casing having fluid under pressure therein and a rectangular opening in one wall, a member mounted within said casing and having a portion extending across said opening and beyond all edges thereof and movable relatively to said walls with one surface in close proximity to said wall, sealing means for the space between said surface of said member and the particular edges of said opening that are parallel to the direction of movement of said surface of said movable member including a sealing element mounted on said wall and extending into said opening at each of said particular edges and having a portion in fluid-tight contact with said surface of said member that is juxtaposed to said particular edges of said opening, and sealing means for the space between said surface of said member and the other edges of said opening including a roller extending across said opening at each of said other edges and having a smooth peripheral surface for fluid-tight rolling contact with said surface of said member and also having end surfaces, said sealing element having other portions extending longitudinally of said rollers in fluid tight contact with said peripheral surfaces and said sealing element having additional portions in continuation of the last-mentioned portions and in fluid-tight contact with the end surfaces of said rollers.

2. The combination of a casing having fluid under pressure therein and a polygonal opening in one wall, a member mounted within said casing and having a portion extending across said opening and beyond all edges thereof and movable relatively to said wall with one surface in close proximity to said wall, sealing means for the space between said portion of said member and the particular edges of said opening that are parallel to the direction of movement of the surface of said movable member including a solid flexible resilient sealing element extending into said opening at each of said particular edges and having a first surface portion in contact with said portion of said member that is juxtaposed to said particular edges of said opening, a rigid channel-shaped holder for said sealing element secured in fluid-tight relation to said casing at each of said particular edges of said opening and facing into said opening, said sealing element being mounted in said holder with at least a second surface portion of the sealing element in fluid-tight slidable contact with the inner surface of at least one side wall of said holder along said particular edges, said sealing element being bodily slidable in said holder toward said member and with said first surface portion projecting from the holder and in contact with said member, means for continually yieldingly actuating said sealing element toward said member to hold said first and second surface portions of the sealing element in fluid-tight frictional contact with said member and with said holder respectively, and means for sealing the space between said member and the other edges of said polygonal opening.

3. The combination as defined in claim 2 wherein said member has a groove exposed through said opening and extending in the direction of movement of said member and having an inwardly facing shoulder at each side thereof, said sealing means also includes a roller at each of opposite ends of said opening and having peripheral and end surfaces in contact with the bottom and said shoulders of said groove respectively to provide a fluid tight contact of said rollers with said member, and said sealing element has portions in contact with the peripheral and the end surfaces of said rollers.

4. The combination as defined in claim 3 wherein said rollers are longitudinally adjustable and said peripheral surfaces are elastic.

5. The combination as defined in claim 3 wherein each roller includes a shaft and a plurality of coaxial sections thereon rotatable with and relatively movable longitudinally of said shaft, and means for moving at least some of said sections longitudinally of the shaft, and said surface on the periphery of each rollers is elastic longitudinally of the roller, whereby the end surfaces of the rollers can be adjusted relatively to said shoulders to maintain proper contact therebetween.

6. The machine as defined in claim 3 with the addition of fluid-pressure operated means constantly yieldingly biasing said rollers toward and into contact with said member, and wherein the peripheral surfaces of the rollers are elastic.

7. The combination as defined in claim 2 wherein the second-named means comprises fluid pressure admitted from said casing into said holder behind said sealing element.

8. The combination defined in claim 2 wherein said sealing element has two spaced longitudinal relatively thin flanges in fluid tight contact with opposite walls of said holder, and the means for yieldingly actuating said sealing element constitutes means for admitting fluid under pressure into said holder behind said sealing element to urge the sealing element into contact with said member and to urge said flanges into contact with said walls of the holder.

9. The combination as defined in claim 2 wherein said sealing element comprises a plurality of relatively longitudinally movable sections and fluid tight slip joints between the ends of adjacent sections.

10. The combination as defined in claim 2 wherein said sealing element is solid and rectangular in cross-section and composed of an elastic substance of the order of rubber.

11. The combination as defined in claim 2 wherein said means for yieldingly actuating said sealing element includes a conduit for passage of fluid pressure from said casing into said holder and into contact with said sealing element.

12. The combination as defined in claim 2 wherein the last-named means includes a roller journaled on said casing at each of opposite ends of said polygonal opening and having a peripheral surface for substantially fluid-tight rolling contact with said movable member, and a solid flexible resilient sealing element for each roller in continuation of the sealing elements at said particular edges of the polygonal opening with surface portions in fluid-tight contact with the peripheral and the end surfaces of the corresponding roller, and a channel-shaped holder secured in fluid-tight relation to the casing adjacent each of said rollers in which the corresponding sealing element is slidably mounted in fluid-tight contact therewith.

13. The combination as defined in claim 12 with the addition of means to constantly yieldingly bias said rollers into fluid-tight contact with said member.

14. The combination as defined in claim 12 wherein the sealing elements at said particular edges of the polygonal opening and for said rollers are integrally molded of a composition of the order of rubber.

15. The combination as defined in claim 2 wherein said member has a groove exposed through said opening and extending in the direction of movement of said member and having an inwardly facing shoulder at each side thereof and means for adjusting said shoulders together and apart, the last-named sealing means also includes a roller at each of opposite ends of said opening and having peripheral and end surfaces in contact with the bottom and said shoulders of said groove respectively to provide a fluid-tight contact of said rollers with said member, and said sealing element has portions in contact with the peripheral and the end surfaces of said rollers.

16. A machine comprising a tank to hold in its lower portion a mix composed of liquids and solids and having a polygonal opening in its wall having portions above and below the level of the mix respectively, a hollow cylinder or drum mounted in said casing to rotate on a horizontal axis so that its lower portion will be submerged in said mix and its upper portion will be disposed above the mix, said drum including a circumferential wall extending across said opening and beyond all edges thereof and having smooth circumferential surfaces and a circumferential foraminous intermediate portion in close proximity to said edges of the opening, certain of said edges extending circumferentially of the drum, said opening in the wall of the tank maintaining atmospheric pressure within said drum, means for raising the pressure in the space above the drum substantially above atmospheric pressure, whereby a layer of solids from said mix will be laid in a layer on said foraminous wall and moved above the level of said mix into said high pressure space upon rotation of said drum, and sealing means for the space between said circumferential wall of the drum and said certain edges of said opening including a solid flexible resilient element extending into said opening and having a first surface portion in contact with said smooth end surfaces of said circumferential wall of said drum, a channel-shaped rigid holder for said sealing element secured in fluid-tight relation to said casing at each of said certain edges of said opening and facing into said opening, said sealing element being mounted in said holder for bodily movement toward said circumferential wall with at least a second surface portion of the sealing element in fluid-tight contact with the inner surface of at least one side wall of said holder along said certain edges and with said first surface portion projecting from said holder in contact with said smooth end surfaces of said circumferential wall of the drum, means for continually yieldingly actuating said sealing element toward said circumferential wall to hold said first and second surface portions of the sealing element in contact with said drum and with said holder respectively, and means for sealing the space between said drum and the other edges of said opening.

17. A machine as defined in claim 16 wherein the last-named sealing means also includes a roller journaled at each of opposite ends of said opening and having a resilient surface in rolling contact with said foraminous circumferential portion of said drum, and said sealing element has portions in fluid-tight contact with the peripheral and the end surfaces of said rollers respectively.

18. A machine as defined in claim 17 wherein said drum has a circumferential inwardly facing shoulder extending outwardly from the circumferential wall of the drum at each end of said foraminous portion, and said rollers have their end surfaces in fluid-tight contact with said shoulders.

19. A machine as defined in claim 16 wherein the last-named sealing means also includes a roller journaled at each of opposite ends of said opening and having a resilient surface in rolling contact with said foraminous circumferential portion of said drum, and said sealing element has portions in fluid-tight contact with the peripheral and the end surfaces of said rollers respectively, said drum having a circumferential inwardly facing shoulder extending outwardly from said circumferential wall at each end of said foraminous portion and each said roller being longitudinally adjustable and having its circumferential surface elastic as well as resilient, and there being means for longitudinally adjusting said rollers to maintain proper contact between the end surfaces of the rollers and said shoulders.

20. The machine as defined in claim 16 with the addition of means within said tank in contact with the edges of said deposited layer to smooth and straighten said edges.

21. A machine as defined in claim 16 wherein the last-named sealing means also includes a roller journaled at each of opposite ends of said opening and having a surface in contact with said foraminous circumferential portion of said drum, and said sealing element has portions in fluid-tight contact with the peripheral and the end surfaces of said rollers respectively, and means to abut the edges of such a deposited layer adjacent the end surface of the one of said rollers above the mix level to restrain spreading of said deposited layer as it passes under the last-mentioned roller to seal the pressure in the tank.

22. The combination with a member having a movable surface in which there is a groove extending in the direction of said movement, of a roller journaled with its peripheral and end surfaces in contact with the bottom and side walls of said groove respectively, said roller being longitudinally extendable and contractable to adjust the contact of said end surfaces with said side walls, and comprising a shaft, a plurality of said coaxial sections thereon rotatable with and relatively movable longitudinally of said shaft, a continuous elastic cover on the peripheral surfaces of said sections to extend and contact upon relative movement of said sections longitudinally of said shaft in opposite directions respectively, and means for moving said sections longitudinally of the shaft.

23. The combination with a member having a movable surface in which there is a groove extending in the direction of said movement, of a roller journaled with its peripheral and end surfaces in contact with the bottom and side walls of said groove respectively, said roller being longitudinally extendable and contractable to adjust the contact of said end surfaces with said side walls and comprising a shaft, a plurality of coaxial sections thereon rotatable with and relatively movable longitudinally of said shaft, said sections being interconnected to provide for relative movement of the sections.

24. The combination of a casing having a rectangular opening, a member movable in one direction across said opening and including a foraminous part and solid smooth surfaces at opposite edges of said foraminous part extending in the direction of movement of said member, certain edges of said opening extending approximately vertically and in the same direction as said smooth surfaces and parallel thereto and the upper and lower edges of said opening extending transversely of said direction, said casing being constructed to hold a mix of liquid and solid particles in suspension therein adjacent the lower of said second-mentioned edges and also having a high pressure chamber for gas under pressure above said mix and said foraminous part of said member being movable first into contact with said mix to cause a deposit of a layer of solids on said foraminous part and then upwardly into said space, sealing apparatus for the edges of said opening including a sealing element mounted on said casing with fluid-tight joints along each of the first-mentioned edges and having portions in fluid-tight contact with said smooth surfaces, sealing means for the space between said layer of solids and the second-mentioned edges of said opening including a roller extending across said opening along each of said second-mentioned edges and having smooth peripheral surfaces for fluid-tight rolling contact with said layer of solids and also having end surfaces, said sealing element having other portions extending longitudinally of said rollers in fluid-tight contact with said peripheral surfaces and said sealing element having other portions in continuation of the last-mentioned portions and in fluid-tight contact with the end surfaces of said rollers, said sealing apparatus also including means to seal the space between the end surfaces of said rollers and the corresponding edges of said layer of solids.

25. The combination as defined in claim 24 wherein the last-named means comprises parts of said sealing element to abut the opposite edges of said layer of solids and the corresponding end surfaces of at least the one of said rollers that is disposed along the upper edge of said opening, at the point of contact of said roller with said layer, to restrain spreading of said deposited layer as it passes under said roller and to seal the pressure in said high-pressure chamber.

26. The combination of a casing having a polygonal opening, a member movable in one direction across said opening with one side juxtaposed to the edges of said opening and having smooth surfaces extending in the direction of movement of said member, certain edges of said opening extending in the same direction as said smooth surfaces and parallel thereto and the other edges of said opening extending transversely of said direction, said casing being constructed to hold a fluid under pressure inwardly of said member, sealing apparatus for the edges of said opening including a sealing element mounted on said casing with fluid-tight joints along each of the first-mentioned edges and having portions in fluid-tight contact with said smooth surfaces, sealing means for the space between said smooth surfaces and the second-mentioned edges of said opening including a roller extending across said opening along each of said second-mentioned edges and having smooth peripheral surfaces for rolling contact with said side of said member and also having end surfaces, said sealing element having other portions extending longitudinally of said rollers in fluid-tight contact with said peripheral surfaces, and said sealing element having other portions in continuation of the last-mentioned portions and in fluid-tight contact with the end surfaces of said rollers.

27. The combination as defined in claim 26 wherein said sealing apparatus includes a rigid channel-shaped holder for the sealing element secured in fluid-tight relation to said casing, and said sealing element is flexible and mounted with at least a surface portion in fluid tight slidable contact with the inner surface of at least one wall of said holder along said edges of said opening, said sealing element being bodily slidable in said holder toward and into contact with said smooth surfaces of said member and said peripheral and end surfaces of said rollers, and means for continually yieldingly influencing said sealing element to hold it in fluid-tight contact with said smooth surfaces of said member and said peripheral and end surfaces of said rollers.

28. The combination as defined in claim 26 wherein the last-named means comprises inwardly facing shoulders on said member extending along said smooth surfaces in the direction of movement of said member in fluid-tight contact with the corresponding end surfaces of said rollers.

References Cited in the file of this patent

UNITED STATES PATENTS

| | | |
|---|---|---|
| Re. 21,201 | Qviller | Sept. 5, 1939 |
| 511,606 | Frink | Dec. 26, 1893 |
| 587,918 | Bidwell et al. | Aug. 10, 1897 |
| 1,166,882 | Beaumont | Jan. 4, 1916 |
| 1,619,371 | Rogers et al. | Mar. 1, 1927 |
| 1,771,355 | Scofield | July 22, 1930 |
| 1,870,971 | Sundstrom et al. | Aug. 9, 1932 |
| 2,356,007 | Sanders | Aug. 15, 1944 |

FOREIGN PATENTS

| | | |
|---|---|---|
| 408,527 | Great Britain | Apr. 12, 1934 |